INVENTOR
Herbert W. Lensner
BY
John L. Stoughton
ATTORNEY

March 28, 1967 H. W. LENSNER 3,311,785
TRANSISTORIZED PHASE COMPARISION RELAYING
Filed Aug. 11, 1964 2 Sheets-Sheet 2

United States Patent Office 3,311,785
Patented Mar. 28, 1967

3,311,785
TRANSISTORIZED PHASE COMPARISON RELAYING
Herbert W. Lensner, East Orange, N.J., assignor to Westinghouse Electric Corporation, Pittsburgh, Pa., a corporation of Pennsylvania
Filed Aug. 11, 1964, Ser. No. 388,871
18 Claims. (Cl. 317—28)

The invention relates generally to relaying apparatus and more particularly to phase-comparison carrier relaying apparatus for protecting a section of an electrical transmission line.

An object of this invention is to provide a relaying system which is quick and positive in operation in response to the faulting of a protected transmission line section and which is insensitive to faults occurring outside of the protected section.

Another object of this invention is to provide such a system in which the response time of the trip relay to a fault signal is a minimum.

A further object is to provide a relaying system in which the relay is "snap actuated."

A still further object of this invention is to provide such relaying system which uses a maximum of static control elements.

Other objects of the invention will be apparent from the specification, the appended claims and the drawings, in which:

Figure 1:
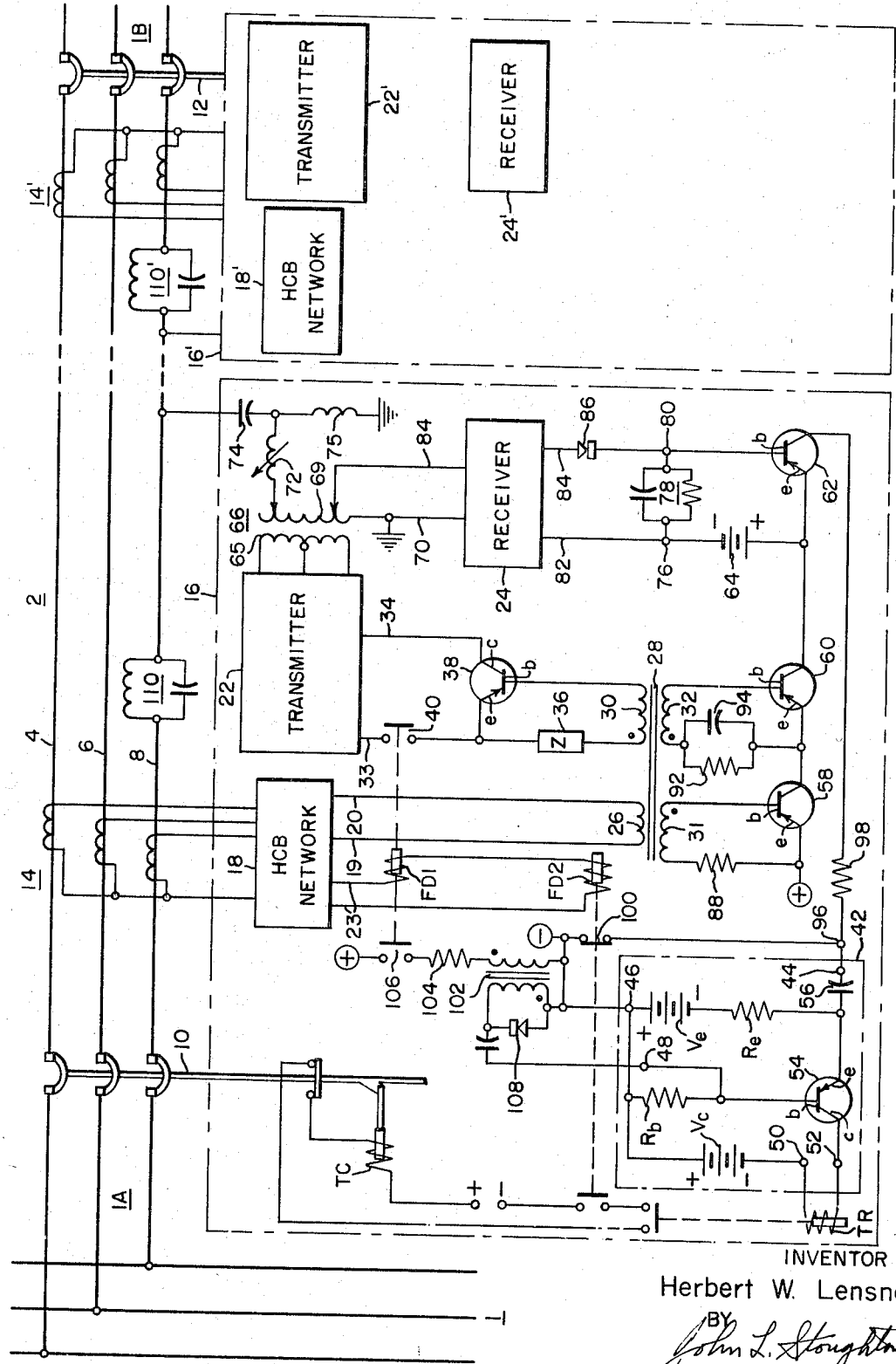
FIGURE 1 is a schematic diagram illustrating a relaying system embodying the invention.

Referring to the drawings by characters of reference, the numeral 1 indicates generally a three phase transmission line energized from a suitable source of electrical energy. The line 1 includes a "protected line section" 2 comprising conductors 4, 6 and 8 connectable to and disconnectable from, portion 1A of the line 1 through the contacts of a circuit breaker 10 and by the circuit breaker 12 to a further portion 1B of the transmission line 1, not further illustrated. The section 1B may or may not be energized from a power source other than through portion 2. The relaying system which protects the line section 2 comprises two identical relaying networks 16 and 16'. Only the network 16, located adjacent the breaker 10, is shown in detail.

The relaying network 16 comprises an HCB network 18, a transmitter 22 and a receiver 24 which together control the energized condition of a tripping relay TR and thereby the tripping of the breaker 10. When a fault occurs in the protected line section 2, the breaker 10 will trip but if a fault occurs externally to the section 2 the breaker 10 will not be tripped.

The HCB network 18 is energized from a current transformer array 14 which senses the current flowing through the conductors 4, 6 and 8 adjacent the breaker 10 and provides a single phase electrical quantity at its output conductors 19 and 20. The direction of power flow through the breaker 10 controls the phase of the single phase quantity. Such a network 18 may take the form of the HCB network shown in my Patent No. 2,406,615 dated Aug. 27, 1946. In this patent, the HCB network is energized by the transformer array 14 and supplied a single phase electrical quantity to a pair of output conductors 19 and 20.

The transmitter 22 may be of any desired type which will transmit an output signal to the receiver 24' during each corresponding first half cycle of the alternating electrical quantity at the output conductors 19 and 20 and will be ineffective to transmit such signal during each second half cycle. This signal is transmitted to the receiver 24' of the network 16' in any suitable manner. As shown, the signal is transmitted over the conductor 8 and for this purpose the transmitter output is applied to the primary winding 65 of a radio frequency transformer 66, having its secondary winding 69 connected to the conductor 8 through a coupling capacitor 74 and inductor 72. The common terminal of the capacitor 74 and the inductor 72 is connected to ground through an inductor 75. If desired, the transmitter 22 may take the form illustrated in my said patent. When possible, I have used herein the same reference characters for like parts as appear in my said patent.

In order that the transmitter transmits its output signal in the form of discrete bursts or pulses each corresponding first half cycle, the input conductors 33 and 34 are energized under control of the output voltage applied to the conductors 19 and 20 of the HCB network through a transformer 28. The primary winding 26 of the transformer 28 is directly connected to the output conductors 19 and 20. Its secondary winding 30 is connected through a phase shifting impedance network 36 between the emitter $e$ and the base $b$ of a transistor 38 to turn on the transistor 38 during "first" half cycles and to hold the transistor blocked during "second" half cycles.

The conductors 33 and 34 are connected between the emitter $e$ and collector $c$ of the transistor 38 through normally open contacts 40 of a fault detecting relay FD1. The contacts 40 correspond to the normally open contacts of the FD relay of the patent and together with transistor 38 control the energized periods of the transmitter 22. Since the transistor 38 conducts solely during the half cycle of the control voltage in which the emitter $e$ is positive with respect to the base $b$, the transmitter 22 will transmit its output signal solely during discrete portions "first half cycles" of the alternating voltage applied to the transformer 28 by the HCB network 18.

Energization of the tripping relay TR is controlled by means of a "snap-acting" switching circuit 42 which is similar to the switching circuit shown on page 83 of a publication entitled, "Transistors Theory and Practice," by R. P. Turner published by Gernsback Publications Inc., 25 W. Broadway, New York 7, N.Y. This circuit includes a first pair of input terminals 44 and 46 and a second pair of input terminals 46 and 48; the terminal 46 serving as the common terminal for both of the pairs 44–46 and 46–48. Output terminals 50 and 52 of the circuit 42 are connected to the winding of the relay TR.

The transistor 54 of the circuit 42 has its emitter $e$ connected through a resistor $R_e$, bias source $V_e$ (shown as a battery for convenience) and a second biasing resistor $R_b$ to the base $b$. The common connection between the source $V_e$ (shown as a battery for convenience) and resistor $R_b$ is connected to terminal 46. The common connection between the resistor $R_b$ and base $b$ is connected to terminal 48. The common connection between emitter $e$ and resistor $R_e$ is connected through a capacitor 56 to terminal 44. The collector $c$ is connected to terminal 52 and source $V_c$ is connected between terminal 50 and the common connection of resistor $R_b$ and source $V_e$. The transistor 54 has a first stable state in which the transistor 54 is maintained non-conductive by the bias voltage $V_e$ in which the output terminals 50 and 52 are deenergized, and a second stable state in which terminals 50 and 52 are energized to energize the tripping relay TR.

When a positive pulse or signal is applied between the first pair of input terminals 44 and 46 through the capacitor 56, the circuit 42 will be transferred to its second stable state in which the transistor 54 is fully conducting.

The transistor 54 will remain conducting until a blocking signal is applied between the second pair of input terminals 46 and 48. This blocking signal elevates the potential of the base 54 thereby driving the transistor 54 into a non-conducting condition to return the network 42 to its first stable state to deenergize the trip relay TR.

The conducting pulse for placing the circuit 42 in its "on" or second stable state is applied to the input terminals 44 and 46, from a suitable source of unidirectional potential as indicated by the terminals marked + and −, solely when the transistors 58, 60 and 62 are all concurrently conductive. The transistor 62 is normally maintained conducting by the bias source 64 which has its positive terminal connected to the emitter $e$ of the transistor 62 and its negative terminal connected to one terminal 76 of an RC network 78. The other terminal 80 of the network 78 is connected to the base $b$ of the transistor 62.

The conduction of transistors 58 and 60 is controlled by the secondary windings 31 and 32 of the transformer 28 in step with the application of the electrical quantity from the HCB network 18. The emitter $e$ and base $b$ of transistor 58 are connected across the winding 31 through a resistor 88 whereby the transistor 58 is rendered conductive in phase with the output potential of the winding 31. The emitter $e$ and base $b$ of transistor 60 are connected across the winding 32 through a network comprising a resistor 92 connected in parallel with a capacitor 94 so that the conduction of the transistor 60 is leading in phase with respect to the transistor 58. This results in a concurrent conducting period of the transistors 58 and 60 to an angle less than 180° of the single phase alternating quantity supplied by the network 18.

The transistor 62 is rendered non-conducting in response to output signals of the receiver 24 which has its output conductors 82 and 84 connected across the network terminals 76 and 80 through a diode 86. The diode 86 and conductors 82 and 84 are connected so that the receiver output will establish a voltage across the network terminals 76 and 80 of opposite polarity to that established by the bias source 64 (shown as a battery for convenience) and of sufficient magnitude to render the transistor 62 blocked or non-conducting. The input conductors 70 and 84 of the receiver 24 are connected to the transformer 66 and will energize the receiver 24 to block conduction of the transistor 62 whenever receiver 24 is receiving a signal from the transmitter 22′ as will be set forth in greater detail below.

If the transmitter 22 has the same output frequency as the transmitter 22′, its signal will also actuate the receiver 24 so that the transistor 62 will be held non-conductive during the intervals that transmitter 24 is transmitting. In such an event, the relative phasing of the local transmitter output signal and of the concurrent conductive periods of the transistors 58 and 60 must be such that the two will not overlap during any period that the absence of a signal from the remote transmitter 22′ should cause tripping by the relaying network 16. In the further description of the preferred embodiment of the invention, it will be assumed that the local receiver is sensitive only to the remote transmitter. In the more generic form of the invention, this limitation as to signal reception is not to be included. When the transistors 58, 60 and 62 are concurrently conductive, the positive pulse for actuating the network to its "on" state is applied to the output terminal 96 of the relaying network 16 through a resistor 98 through an obvious circuit providing, however, that the fault detecting relay FD2 has been energized and its normally closed contacts 100 are open.

The turn-off signal for actuating the switching circuit 42 to its "off" state is obtained from the collapse of flux in the core of a transformer 102; the primary winding of which is connected between the negative and positive battery terminals through a current limiting resistor 104 and the normally open contacts 106 of the fault detecting relay FD1. As will be set forth in more detail below, the fault detecting relay FD1 operates in response to a first predetermined magnitude of the output signal of the HCB network 18 while the fault detecting relay FD2 operates at a slightly higher magnitude of output signal. During the interval immediately following the closing of the contacts 106, charging current flows through the primary winding of the transformer 102 building up flux in its core. The resulting voltage in the secondary winding is shunted through a diode 108 and will not have an effect on the network 42. When however the relay FD1 opens its contacts 106 following termination of the fault current, the flux in the core of the transformer 102 collapses. This induces a voltage in the secondary winding in a polarity which is blocked by the diode 108 and a positive to negative pulse is supplied to the second pair of input terminals 48–46. The polarity of this pulse renders the transistor 54 of the switching circuit 42 blocked, to place the network 42 in its off state and the tripping relay TR is deenergized.

It is believed that the remaining details of construction may best be understood by a description of the operation of the apparatus which is as follows: Normally the circuit breakers 10 and 12 are maintained in their closed position, as shown, whereby electric current may flow through the protected line section 2. In the event of a fault in the protected line section 2, the current flow thereinto will substantially increase. This results in an increase in the output potential at the output terminals 23 of the HCB network 18. When the fault current reaches a first critical magnitude, the output potential at the output terminals 23 reaches the first predetermined magnitude whereby current flows through the winding of the fault detecting relay FD1 to cause it to close its normally open sets of contacts 40 and 106.

As indicated in my said patent, the terminals may be energized with D.C. from the single phase quantity as through the full wave rectifier 23 thereof. If desired, the relays FD1 and FD2 may be connected in parallel or may be energized from an alternating quantity. In case the relays are energized from the terminals 19 and 19 of my said patent, it might be desirable to omit the glow tube 18 thereof. Closure of the contacts 106 is without immediate effect and serves merely to establish a predetermined magnitude of flux in the iron of the transformer 102 for the purpose of resetting the switching circuit 42 at some future time. Closure of the contacts 40 transfers sole control of the circuit of the transmitter input or control conductors 33–34 to the transistor 38.

The alternating electrical quantity at the output terminals 19 and 20 of the HCB network energizes the primary winding 26 of the transformer 28 to provide alternating output signals at the secondary windings 30, 31 and 32. The output signal of the winding 30 causes the transistor 38 to conduct during each of a first half cycles of the output signal and at a phase angle with respect to the output quantity of the HCB network 18 as determined by the phase shifting impedance network 36. During the half cycles that the transistor 38 conducts, the transmitter 22 will apply a radio-frequency signal through the primary winding 65 of the radio frequency transformer 66 to the conductor 8. The signal will be transmitted along the conductor 8 to the second or remote end portion of the protected line section 2. The signal is held within the section 2 by filter networks 110 and 110′ which permit the line frequency power to flow therethrough but which block the radio frequency power of the transmitters 22 and 22′.

The angle of conduction of the transmitter 22 is adjusted so that it energizes the receiver 24′ during the concurrent conducting interval of the transistors 58 and 60 of the remote relaying network 16′ providing, however, that the fault current is flowing through the remote end of section 2 in the opposite direction as at the local end. By opposite direction, is meant into the section at one end and out of the section at the other end or vice versa. Preferably, the angle is adjusted to center the energization of the receiver 24' such that its energized intervals R (FIG. 3) are centered with respect to the concurrently conductive intervals C (FIG. 3) of the transistors 58 and 60 of the relaying network 18'. The phase shifting network (92–94) may be adjusted so that the concurrent conductive period of the transistors 58 and 60 may be longer or shorter as indicated in FIGS. 3A–3H wherein $E_{31}$ and $E_{32}$ represent base voltages applied to render the transistors 58 and 60 conductive respectively.

Figure 3A:
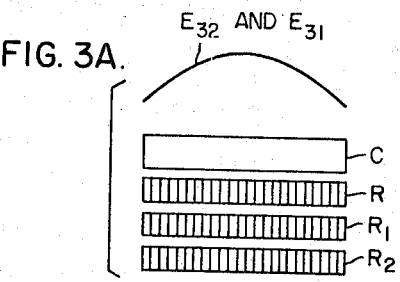
FIGS. 3A–3H illustrate various operating relationships of the relaying system.
Figure 3B:
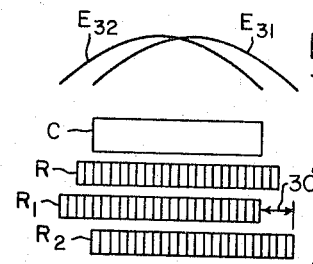
Figure 3C:
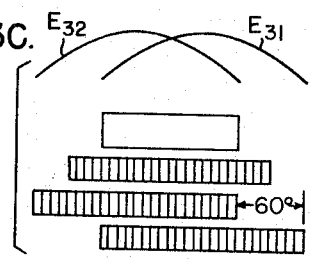
Figure 3D:
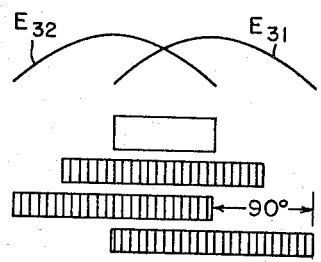
Figure 3E:
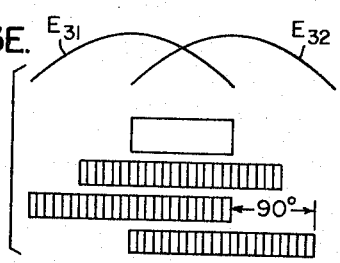
Figure 3F:
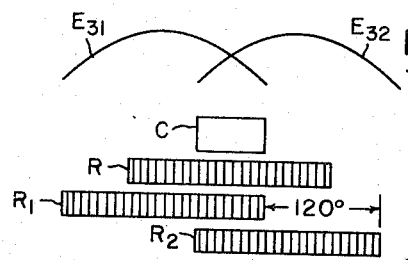
Figure 3G:
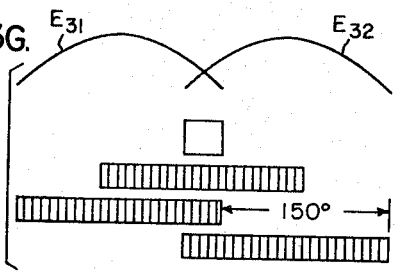
Figure 3H:
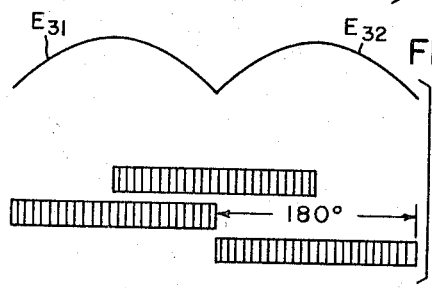

FIGS. 3A and 3H represent the extreme or limiting conditions. In FIG. 3A, the voltages $E_{31}$ and $E_{32}$ supplied to the transistors 58 and 60 are in phase and the concurrent conductive period C is of 180° duration. FIG. 3H represents the opposite extreme in which the voltages $E_{31}$ and $E_{32}$ are phase displaced 180° and there is no period of concurrent conduction of the transistors 58 and 60 and the period C is absent as indicated.

FIGS. 3B through 3G disclose intermediate operating phase relationships. The relationships shown in FIGS. 3A–3D occur at one relative polarity of the voltages supplied by the winding 31 to the transistor 58 and by the winding 32 to transistor 60 for progressively increasing leading phase angle of the current to the base of transistor 60. FIGS. 3E through 3H represent operating relationships which occur at opposite relative polarity progressively for decreasing leading phase angles of the current to the base of transistor 60. It will be appreciated that similar results may be obtained by using a phase shifting network which causes the current to lag the voltage. Also, if desired, a phase shifting circuit operable through 180° may be utilized.

A more complete understanding of the schematic representation of FIGS. 3A–3H may be had of a more detailed description of one thereof. For this purpose, reference is made to FIG. 3F wherein the half cycles of base-emitter voltage which renders the transistor 58 conducting is represented by the curve $E_{32}$ and that applied to the transistor 60 is represented by the curve $E_{31}$. It will be observed that the interval C during which the transistors 58 and 60 are rendered concurrently conductive is 60°. In the absence of an output signal from the receiver 24, the output terminal 96 would be connected through resistor 98 to the D.C. plus terminal which is, as shown, connected to the input terminal 44 of the switching network 42. If at this time the fault detecting relay FD2 was energized to open its normally closed contacts 100, the network 42 would be actuated to its one state in which the tripping relay TR is energized to open the breaker 10. This is the situation which should prevail for a fault within the "protected line section" 2. If, however, the fault is external to the section 2, the breaker 10 should not be opened. The location of the fault relative to the section 2 is sensed by the relative phase angle of the electrical quantities applied to the transformers 28 of the relaying networks 16 and 16' from the HCB networks 18 and 18'. For this purpose, the phase of the signals supplied by the networks 18 and 18' are so arranged that when current is flowing into the section 2 at one end portion and out of the other end portion thereof, the signal bursts supplied by the transmitter 22' or 22 at the remote end to the receiver 24 or 24' at the local end occur during the interval that the transistors 58 and 60 of the network 16 or 16' are concurrently conductive. Ideally this would be during the interval R (FIG. 3F). Due to the impedance of the line section 2, the phase of the current at the two transformer arrays 14 and 14' may vary, with the type of fault and the fault current magnitude. With applicant's arrangement, a blocking signal variation, as indicated by the rectangles $R_1$ and $R_2$, could occur without permitting the network 42 to be actuated to its on state even though only a very few degrees of concurrent conductions of transistors 58, 60 and 62 are required to actuate the network 42 to its on state. With the relative phase shift of the voltages $E_{31}$ and $E_{32}$ as shown in FIG. 3F, the limits of change in phase of the signal supplied to the receiver 24 which must be present to prevent energization of the switching circuit 42 may vary as much as 60° either way from its normal position R as indicated by the rectangles $R_1$ and $R_2$.

Figure 2:
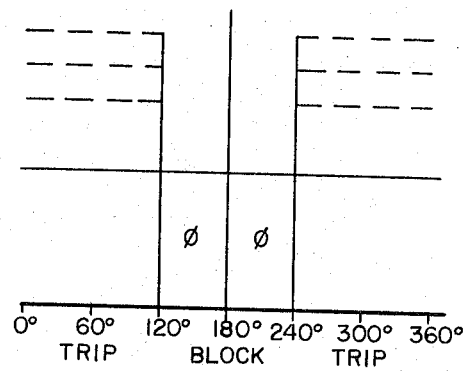
FIG. 2 illustrates an operating characteristic of the invention.

This relationship of blocking of the tolerance of the blocking signal from the transmitter 22' is also indicated in FIG. 2 wherein 180° indicates the normal position of the blocking signal R and the 120° and 240° points indicate the maximum excursion of this signal from the normal before the concurrent conduction of the transistors 58, 60 and 62 for energization of the switching circuit 42 can exist.

When the fault occurs within the protected section 2, the flow of current will be in the same directions through the circuit breakers 10 and 12. This change in relative direction causes a 180° reversal of the phase of the output potential of one of the HCB networks which is assumed to be the network 18'. This reversal causes the transmitter 22' to actuate the receiver 24 so that its output signal R now occurs at a phase displacement of 180° from the position of the signal R as indicated by FIG. 3F. The receiver 24 can not apply a blocking signal to the network 78 during the interval that the transistors 58 and 60 are concurrently conducting thereby resulting in the concurrent conduction of all of transistors 58, 60 and 62. This concurrent conduction connects the output terminal 96 to the plus terminal of the D.C. supply.

If, as has been assumed, the contacts 100 are open at this time, the potential at terminal 96 will approach that of the + terminal. This causes the switching circuit 42 to go to its "on" state to energize the tripping relay TR. Closure of the normally open contacts of relay TR completes an energizing circuit for the trip coil TC of the breaker 10 through the now closed normally open contacts of the FD2 relay. This results in the opening of the breaker 10 to disconnect the local end of the protected line section 2 of transmission line 1.

It will be apparent from an examination of FIGS. 3A through 3H that the angle of blocking tolerance may be decreased to zero degrees as illustrated in FIG. 3A in which very little phase displacement of the receiver output R will permit false tripping of the breaker 10 to an opposite limit as illustrated in FIG. 3H in which the transistors 58 and 60 are never concurrently conducting and in which the tripping relay TR cannot be actuated irresponsive of the signal supplied by the receiver 24 as the consequence of the operation of the transmitter 22'. It is of course apparent that these operations are undesirable.

Although the invention has been described with reference to certain specific embodiments thereof, numerous modifications falling within the spirit and scope of the invention are possible.

What is claimed and is desired to be secured by United States Letters Patent is as follows:

1. A relaying apparatus for connection to a transmission line to supervise the energized condition of a section thereof comprising, a control network having input terminals adapted to be energized as a function of the flow of an electrical quantity through the section, the control network having a plurality of pairs of output terminals, each said pair of terminals being energized with a pulsating output voltage, a transformer having a plurality of windings, means connecting a first of said windings for energization by said output voltage, a plurality of semiconductor switches, each said switch having a main circuit and a control circuit for placing its associated said main circuit in a conductive condition, a trip circuit including said main circuits of a first and a second and a third of said switches, said trip circuit being effective to actuate said relaying apparatus solely when all of said just-mentioned main circuits are conducting, means connecting said control circuit of said first switch to a second of said windings, a phase shifting circuit, means connecting said control circuit of said second switch to a third of said windings and including said phase shifting circuit, a control circuit connected to said control circuit of said third switch, said last-named control circuit having a normal operating condition in which it maintains said main circuit of said third switch conducting and an actuated condition in which it maintains said main circuit of said third switch nonconducting, and a means effective to place said last-named control circuit in its said actuated conditions.

2. A relaying apparatus for connection to a transmission line to supervise the energized condition of a section thereof comprising, a control network having input terminals adapted to be energized as a function of the flow of an electrical quantity through the section, the control network having a plurality of pairs of output terminals, each of said pair of terminals being energized with a pulsating output voltage, a plurality of valves each said valve having a main circuit and a control circuit for placing its associated said main circuit in a conductive condition, said network including circuit means to phase displace the occurrence of the pulses at a first pair of said pairs of output terminals from the occurrence of the pulses at a second pair of said pairs of output terminals, a trip circuit including said main circuits of a first and a second and a third of said valves, said trip circuit being effective solely when all of said just-mentioned main circuits are in a first operating condition, means connecting said control circuit of said first valve to said second pair of terminals, and means connecting said control circuit of said second valve to said third pair of terminals, a control circuit connected to said control circuit of said third switch, said last-named control circuit having a normal operating condition in which it maintains said main circuit of said third valve in its said first operating condition and an actuated condition in which it maintains said main circuit of said third valve in a second operating condition.

3. The combination of claim 2 in which there is provided a signal generator having input terminals energized to initiate operation of said generator, means controlling the energization of said input terminals of said generator and including a third pair of said pairs of terminals, and a switching device having circuit controlling means and an operator, means connecting said circuit controlling means in circuit with said generator input terminals and said operator to a pair of said output terminals, said operator normally maintaining its associated said circuit controlling means in a condition to render said signal generator ineffective, said operator being effective as a consequence of a predetermined magnitude of the energization of the said pair of output terminals to which it is connected to actuate its associated said circuit controlling means to render said generator effective.

4. A relaying apparatus for connection to a transmission line to supervise the energized condition of a section thereof comprising, a control network having input terminals adapted to be energized as a function of the flow of an electrical quantity through the line section, the control network having a plurality of pairs of output terminals, each of said pairs of terminals being energized with a pulsating output voltage, said network including circuit means to time the relative occurrences of the pulses of said pairs of output terminals whereby said pulses at a first of said pairs of output terminals occurs a first instant different from a second instant at which said pulses occur at a second of said pairs of output terminals and whereby said pulses at a third of said pair of output terminals occur at a third instant which is different in time from said first and second instants, a pair of power terminals adapted to be energized from a source of electrical energy, a plurality of electric valves, each said valve having a main circuit and a control circuit for placing its associated said main circuit in a conductive condition in response to the application thereto of a control signal, a generator having input terminals energized to initiate operation of said generator, means connecting said input terminals of said generator to said power terminals and including said main circuit of a first of said valves, means connecting said control circuit of said first switch to said first pair of terminals, a trip circuit connected to said power terminals and including said main circuits of a second and a third and a fourth of said valves, said trip circuit being effective solely when all of said just-mentioned main circuits are conducting, means connecting said control circuit of said second valve to said pair of terminals, means connecting said control circuit of said third valve to said second pair of terminals and a control circuit connected to said control circuit of said fourth valve, said last-named control circuit having a normal operating condition in which it maintains said main circuit of said fourth valve conducting and an actuated condition in which it maintains said main circuit of said fourth valve non-conducting.

5. A relaying apparatus for connection to a transmission line to supervise the energized condition of a breaker which controls flow of energy from a source into a section of the transmission line comprising, a control network having input terminals adapted to be energized as a function of the flow of an electrical quantity through the breaker, the control network having a plurality of pairs of output terminals each of said pairs of terminals being energized with an alternating output voltage, the magnitude of said output voltage varying as a function of the magnitude of the electrical quantity, said network including phase shifting circuitry for controlling the output voltages at first and second pairs of said pairs of output terminals, said output voltages at said first and second pairs of output terminals being phase displaced from the output voltage at a third pair of said pairs of output terminals, a pair of power terminals adapted to be energized from a source of electrical energy, a plurality of semiconductor switches, each said switch having a main circuit and a control circuit for placing its associated said main circuit in a conductive condition as a consequence of the application thereto of a voltage of a first polarity, a signal generator having input terminals energized to initiate operation of said generator, means connecting said input terminals of said generator to said power terminals and including said main circuit of a first of said switches, a means connecting said control circuit of said first switch to said first pair of output terminals, a relaying apparatus having a controlled circuit and a controlling connection for controlling the operation condition of said controlled circuit, a trip circuit connecting said controlling connection to said power terminals and including said main circuits of a second and a third and a fourth of said switches, said trip circuit being effective to actuate said relaying apparatus solely when all of said just-mentioned main circuits are conducting, means connecting said control circuit of said second switch to said third pair of output terminals, means connecting said control circuit of said third switch to said second pair of output terminals, a control circuit connected to said control circuit of said fourth switch, said last-named control circuit having a normal operating condition in which it maintains said main circuit of said fourth switch conducting and an actuated condition in which it maintains said main circuit of said fourth switch nonconducting, and a signal receiver operable to place said last-named control circuit in its said actuated conditions.

6. A relaying apparatus for connection to a transmission line to supervise the energized condition of a breaker which controls flow of energy from a source into a section of the transmission line comprising, a control network having input terminals adapted to be energized as a function of the flow of an electrical quantity through the breaker, the control network having output terminals energized with an alternating polarity output voltage which varies as a function of the magnitude of the electrical quantity, a transformer having a plurality of windings, means connecting a first of said windings for energization by said output voltage, a pair of power terminals adapted to be energized from a source of electrical energy, a plurality of semiconductor switches, each said switch having a main circuit and a control circuit for placing its associated said main circuit in a conductive condition, a signal generator having input terminals energized to initiate operation of said generator, means connecting said input terminals of said generator to said power terminals and including said main circuit of a first of said switches, a first phase shifting circuit, means connecting said control circuit of said first switch to a second of said windings and including said first phase shifting circuit, a relaying apparatus having a controlled circuit and a controlling connection for controlling the operating condition of said controlled circuit, a trip circuit connecting said controlling connection to said power terminals and including said main circuits of a second and a third and a fourth of said switches, said trip circuit being effective to actuate said relaying apparatus solely when all of said just-mentioned main circuits are conducting, means connecting said control circuit of said second switch to a third of said windings, a second phase shifting circuit, means connecting said control circuit of said third switch to a fourth of said windings and including said second phase shifting circuit, a control circuit connected to said control circuit of said fourth switch, said last-named control circuit having a normal operating condition in which it maintains said main circuit of said fourth switch conducting and an actuated condition in which it maintains said main circuit of said fourth switch non-conducting, and a signal receiver operable to place said last-named control circuit in its said actuated conditions.

7. The combination of claim 6 in which there is provided a pair of relaying devices, each said relaying device having an actuated circuit controlling portion and a control circuit portion controlling the conductive condition of its said actuated portion, means connecting said control circuit portions for energization by said output voltage of said control network, said relaying devices being arranged such that said actuated portion of a first thereof is actuated at a lower value of said output voltage than the second thereof, said actuated portion of said first relaying device being connected in series circuit with said main circuit of said first switch and said actuated portion of said second relaying device being connected to control the actuation of said controlling connection of said relaying apparatus by said trip circuit.

8. The combination of claim 6 in which said second winding is connected to said control circuit of said first switch in opposite polarity to the connection of said third and said fourth windings to said control circuits of said second and said third switches and in which said switches conduct solely in response to one polarity of voltage applied thereto.

9. The combination of claim 8 in which said semiconductor switches are transistors, in which said first phase shifting circuit causes the current through said second winding to lag the voltage and in which said second phase shifting circuit causes the current through said fourth winding to lead the voltage.

10. In a relaying system for protecting a section of an alternating potential electrical transmission line having circuit breakers located at each end portion of said section and operable to isolate said section from said transmission line, first and second control networks having input terminals and output terminals, means connecting said input terminals of said first control network to said transmission line adjacent a first end portion of said section, means connecting said input terminals of said second control network to said transmission line adjacent a second end portion of said section, first and second transformers, each said transformer having a primary winding and first and second and third secondary windings, means connecting said primary winding of said first transformer to said output control terminals of said first control network, a plurality of switching devices, each said switching device having a main circuit and a control circuit, first and second receiving units, each said receiving unit having a signal input connection and a signal output connection, first and second signal generators, each said generator having control terminals and output terminals, means operatively conducting a control signal from said output terminals of said first generator to said input connection of said second receiving unit and operatively conducting a control signal from said output terminals of said second generator to said input connections of said first receiving unit, an energizing circuit for energizing said control terminal of said first generator and including said main circuit of a first of said switching devices, means connecting said control circuit of said first switching device to said first secondary winding of said first transformer whereby said first generator is effective to provide its signal solely during 180° of the alternating potential supplied to said first transformer, a first actuating circuit for the one of said breakers which is adjacent said first end portion of said section, said first actuating circuit including in series connection said main circuits of a second and a third and a fourth of said switching device whereby said one breaker is actuatable to disconnect said first end portion of said section from said transmission line solely when all of said just-named main circuits are conducting, a first phasing network means individually connecting said control circuits of said second and said third asymmetric devices to said second and said third secondary windings of said first transformer and including said first phasing network whereby said main circuits of said second and third transistors are rendered conducting for a first interval, said first interval being less than 180 degrees of the voltage supplied to said first transformer, means connecting said primary winding of said second transformer to said output control terminals of said second control network, an energizing circuit for energizing said control terminals of said second generator and including said main circuit of a fifth of said switching devices, means connecting said control circuit of said fifth switching device to said first secondary winding of said second transformer whereby said second generator is effective to provide its signal solely during 180 degrees of the alternating potential supplied to said second transformer, a second actuating circuit for the other of said breakers which is adjacent said second end portion of said section, said second actuating circuit including in series connection said main circuits of a sixth and a seventh and an eighth of said switching devices whereby said other breaker is actuatable to disconect said second end portion of said section from said transmission line solely when all of said last-named main circuits are conducting, a second phasing network, means individually connecting said control circuits of said sixth and said seventh switching device to said second and said third secondary windings of said second transformer and including said second phasing network whereby said main circuits of said sixth and seventh switching devices are rendered conducting for a second interval, said second interval being less than 180 degrees of the voltage supplied to said second transformer, circuit means connected to said control circuit of said fourth switching device and effective to maintain said main circuit of said fourth switching device normally conductive, said just-introduced circuit means including said signal output connection of said first receiving unit and being effective in response to an output signal at said output connection of said first receiving unit to render said main circuit of said fourth switching device non-conductive, circuit means connected to said control circuit of said eighth transistor and effective to maintain said main circuit of said eighth switching device normally conductive, said last-introduced circuit means including said signal output connection of said second receiving unit and being effective in response to an output signal at said output connection of said second receiving unit to render said main circuit of said eighth switching device non-conductive, said phasing of the 180° degrees during which said first generator is effective with respect to the said second interval being such that said signal output connection of said second receiving unit is provided with an output signal throughout said second interval when the direction of power flow is into one of said section end portions and out of the other of said section end portions, said phasing of the 180 degrees during which said second generator is effective with respect to the first interval being such that said signal output connection of said first receiving unit is provided with an output signal throughout said first interval.

11. In a relaying system for protecting a section of an alternating potential electrical transmission line having circuit breakers located at each end portion of said section and which breakers are operable to isolate said section from said transmission line, a first control network connected to said transmission line adjacent a first end portion of said section and having output control terminals energizable with alternating potential as a function of an operating condition of said first end portion of said section, a second control network connected to said transmission line adjacent a second end portion of said section and having output control terminals energizable with alternating potential as a function of said operating condition of said second end portion of said section, first and second transformers, each said transformer having a primary winding and first and second and third secondary windings, means connecting said primary winding of said first transformer to said output control terminals of said first control network, a plurality of transistors, each said transistor having a main circuit and a control circuit, first and second signal transmitting units, each said unit having control terminals and output terminals, means connecting said output terminals of said first transmitting unit to said first end portion of said section, an energizing circuit for energizing said control terminals of said first transmitting unit and including said main circuit of a first of said transistors, a first phasing network, means connecting said control circuit of said first transistor to said first secondary winding of said first transformer and including said first phasing network, a first actuating circuit for the one of said breakers which is adjacent said first end portion of said section, said first actuating circuit including in series connection said main circuits of a second and a third and a fourth of said transistors whereby said one breaker is actuatable to disconnect said first end portion of said section from said transmission line solely when all of said just-named main circuits are conducting, a second phasing network, means individually connecting said control circuits of said second and said third transistors to said second and said third secondary windings of said first transformer and including said second phasing network whereby said main circuits of said second and third transistors are rendered conducting for a first interval less than 180 degrees of the voltage applied to said primary winding of said first transformer, means connecting said primary winding of said second transformer to said output control terminals of said second control network, means connecting said output terminals of said second transmitting unit to said second end portion of said section, an energizing circuit for energizing said control terminals of said second transmitting unit and including said main circuit of a fifth of said transistors, a third phasing network, means connecting said control circuit of said fifth transistor to said first secondary winding of said second transformer and including said third phasing network, a second actuating circuit for the other of said breakers which is adjacent said second end portion of said section, said second actuating circuit including in series connection said main circuits of a sixth and a seventh and an eighth of said transistors whereby said other breaker is actuatable to disconnect said second end portion of said section from said transmission line solely when all of said last-named main circuits are conducting, a fourth phasing network means individually connecting said sixth and said seventh transistors to said second and said third secondary windings of said second transformer and including said fourth phasing network whereby said sixth and seventh transistor are rendered conducting for a second interval less than 180 degrees of the voltage applied to said primary winding of said second transformer, first and second receiving units, each said receiving unit having a signal input connection and a signal output connection, means connecting said signal input connection of said first receiving unit to said line adjacent said first end portion of said section, means connecting said signal input connection of said second unit to said line adjacent said second end portion of said section, circuit means connected to said control circuit of said fourth transistor and effective to maintain said main circuit of said fourth transistor normally conductive, said just-introduced circuit means including said signal output connection of said first receiving unit and being effective in response to the existence of an output signal at said output connection of said first receiving unit to render said main circuit of said fourth transistor non-conductive, circuit means connected to said control circuit of said eighth transistor and effective to maintain said main circuit of said eighth transistor normally conductive, said last-introduced circuit means including said signal output connection of said second receiving unit and effective in response to the existence of an output signal at said output connection of said second receiving unit to render said main circuit of said eighth transistor non-conductive, said phasing of said first secondary winding of said first transformer with respect to said second and said third secondary windings of said second transformer being such that said signal output connection of said second receiving unit is provided with an output signal throughout said second interval when the direction of power flow is into one of said section end portions and out of the other of said section end portions, said phasing of said first secondary winding of said second transformer with respect to said second and said third secondary windings of said first transformer being such that said output connection of said first receiving unit is provided with an output signal throughout said first interval when the direction of power flow is into one of said section end portions and out of the other of said section end portions, and means for rendering said energizing circuits for said first and second transmitters effective solely when the output of said first and second control networks is respectively above a predetermined minimum magnitude.

12. In a relaying system for protecting a section of an electrical transmission system, first and second condition responsive devices, each said device having an alternating potential output which changes in phase in response to a reversal in the direction of the flow of an electrical quantity, means connecting said first device adjacent a first end portion of said section whereby the phase of its said alternating potential output is responsive to the direction of flow of said quantity at said first end portion, means connecting said second condition responsive device adjacent a second end portion of said section whereby the phase of its said alternating potential output is responsive to the direction of flow of said quantity at said second end portion of said section, first switch means having first and second switching portions, said switch means being conductive when both of said switching portions are conductive, means responsive to said alternating potential output of said first device for actuating said switch means portions in sequence whereby the interval during which both said switch means portions are concurrently conductive is less than 180 degrees of said output of said first device, a second switch means connected in series with said first switch means and normally maintained in its conducting condition, means operatively connecting said second device to said second switch means whereby said second switch means is rendered non-conductive when the phase of said alternating potential output of said second device represents a flow of said quantity through said second end portion in a direction opposite to the flow of said quantity through said first end portion.

13. In a relaying system for protecting a section of an electrical transmission system, a first condition responsive device for sensing an operating condition of a first end portion of said section, said device having an alternating potential output signal which reverses in phase in response to a reversal in the direction of the flow of an electrical quantity at said first end portion, a second condition responsive device for sensing said operating condition of a second end portion of said section, said second device having a pulsing output signal of the same frequency as said output signal of said first device, the phase of said pulsing output relative to the phase of said alternating potential signal being controlled as a function of the direction of the flow of said electrical quantity at said second end portion, switch means having first and second and third portions, each said portion having a conducting and a non-conducting condition and actuating means for controlling its said condition, said switch means being in a first controlling condition solely when all of said portions are in a respective first of their said conditions and being in a second controlling condition at all other times, means connecting said actuating means of said first and sceond switch portions to said first device whereby said first and second portions are maintained in their said first conditions solely during fractional portions of the cycle of said alternating potential output signal, said first-named connecting means including means to change the relative times in said cycle of said alternating potential signal that said first and second switch portions are placed into their said first conditions, means normally maintaining said third portion in its said first condition, and means connecting said actuating means of said third portion to said second device whereby said pulsing signals will actuate said third portion out of its said first condition, said last named connecting means phasing said pulsing output signal such that, when the direction of flow of said quantity at said first end portion is a first relative direction between said system and said section and the direction of flow of said quantity at said second end portion is in a relative direction between said system and said section opposite to said first relative direction, said third portion is maintained out of its said first condition.

14. A relaying device for use in protecting a section of an electrical network, a condition responsive network adapted to be connected to said electrical network for providing a control signal which is changeable from a first to a second condition in response to a reversal of the direction of flow of an electrical quantity in said electrical network, first and second switching devices connected to said responsive network for energization in response to the condition of said signal, a plurality of switch means, each said switch means having a first and a second controlling condition, a first and a second and a third of said switch means comprising an AND circuit, operating means responsive to the existence of said signal to pulsatingly actuate a first and a second of said switch means into one of their controlling conditions, said operating means including means to delay the actuation of one of said first and second switch means into its said one condition with respect to the actuation of the other of said first and second switch means, an operated apparatus, an energizing circuit for controlling said apparatus and including said AND circuit, said energizing circuit being effective to actuate said operated apparatus solely when each of said switches of said AND circuit is in its said one condition, means normally maintaining said third switch means in its said first condition, and means operable in response to an operating condition of said network to actuate said third switch means to the other of its said second conditions.

15. A relaying apparatus for connection to a transmission line to supervise the energized condition of a section thereof comprising, an energizing network having first and second pairs of output terminals, a switching circuit having first and second pairs of control terminals, said circuit being operable in response to the energization of said first pair of control terminals in a first polarity to assume a first operating condition and operable in response to the energization of said second pair of control terminals in a second polarity to assume a second operating condition, first circuit means actuated by said first pair of output terminals for energizing said first pair of control terminals, a transformer, second circuit means energized by said second pair of output terminals for energizing said second pair of control terminals in said second polarity, said second circuit means including said transformer, a diode connected in said second circuit means to prevent establishment of a potential between said second control terminals in a polarity opposite to said second polarity, and selectively operable control means connected to permit the energization of said first pair of control terminals solely during selected periods.

16. In a relaying apparatus for connection to a transmission line to supervise the energized condition of a section thereof, an energizing network having input terminals adapted to be energized as a function of an electrical characteristic of said section, said network having first and second pairs of output terminals, at least said second pair of output terminals being energized with an electrical quantity which varies in magnitude with a change in the energization of said input terminals, at least said first pair of output terminals being pulsatingly energized, a switching circuit having first and second pairs of control terminals, said switching circuit having first and second stable operating conditions and being transferred from its said first to said second condition in response to the energization of said first pair of control terminals in a first polarity and from its said second to said first condition in response to the energization of said second pair of control terminals in one polarity, a source of unidirectional potential, first and second switch devices, each said switch device having an operating device and a control device effective to be placed in first and second operating conditions as a consequence of changes in the energized condition of its said operating device, selectively operable switch means having a potential path and a control connection operable when energized to render said potential path effective, a first electric path connecting said source of potential to said first pair of control terminals in a polarity to provide said first polarity, said first path including said control device of said second switch device and said potential path of said selectively operable switch means, a transformer having a core, a second electric path connecting said source of potential to said second pair of control terminals and including said control device of said first switch device and said transformer, said second path being operable in response to a change in condition of said control device of said first switch device to alter the flux in said core, a diode connected in said second path and effective to prevent the energization of said second pair of control terminals in a polarity opposite to said one polarity by said change in flux in said transformer, said control device of said first switch device being effective in its said second condition to render said selectively operable control means effective and effective in its said first condition to render said selectively operable control means ineffective, means connecting each said operating device to said second pair of output terminals, said first switch device being actuated to change said condition of its said control device at a first predetermined magnitude of said electrical quantity at said second output terminals and said second switch device being actuated to place its said control device in its said second condition at a second predetermined magnitude of said electrical quantity at said second output terminals, and circuit means connecting said first pair of output terminals to said input connections of said selectively operable switch means, said first predetermined magnitude being less than said second predetermined magnitude.

17. The combination of claim 16 in which the said first electric path includes a third switch device series connected with said potential path, said third switch device having a first circuit condition and a second circuit condition means normally maintaining said third switch device in its said first condition, a second energizing network having input terminals adapted to be energized as a function of said electrical characteristic of said second and output terminals, and a signal network including signal transmitting means connecting said third switch device to output terminals of said second energizing network and responsive to the energization of said output terminals of said second energizing network to actuate said third switch device from its said first condition into its said second condition.

18. The combination of claim 17 in which said output terminals of said second energizing network and said first pair of output terminals of said first normal energizing network are energized with alternating potential which is phase orientated with respect to the direction of flow of said electrical characteristics through said section whereby said third switch device is actuated to its said second condition during the interval that said first-named energizing network is rendering said potential path of said selectively operable switch means effective.

References Cited by the Examiner
UNITED STATES PATENTS

| | | | |
|---|---|---|---|
| 2,873,410 | 2/1959 | Hodges | 317—28 |
| 2,879,453 | 3/1959 | Hodges et al. | 317—28 |
| 2,879,454 | 3/1959 | Hodges et al. | 317—28 |
| 3,201,651 | 8/1965 | Calhoun | 317—29 X |
| 3,240,998 | 3/1966 | Sonnemann | 317—27 X |

MILTON O. HIRSHFIELD, *Primary Examiner.*

R. V. LUPO, *Assistant Examiner.*